United States Patent [19]

Nartowski

[11] Patent Number: 4,466,248
[45] Date of Patent: Aug. 21, 1984

[54] CONTROL DEVICE FOR THE TURBINE BYPASS VALVE OF A TURBOCHARGED INTERNAL COMBUSTION ENGINE

[75] Inventor: André Nartowski, Marly-le-Roi, France

[73] Assignee: Regie Nationale des Usines Renault, Boulogne-Billancourt, France

[21] Appl. No.: 392,606

[22] Filed: Jun. 28, 1982

[30] Foreign Application Priority Data

Jul. 3, 1981 [FR] France .................... 81 13111

[51] Int. Cl.³ .................................... F02B 37/12
[52] U.S. Cl. .................................... 60/602
[58] Field of Search ............... 60/600, 601, 602, 603, 60/611; 123/564

[56] References Cited

U.S. PATENT DOCUMENTS 3,233,403 2/1966 MacInnes ................ 60/602

FOREIGN PATENT DOCUMENTS 1472398 1/1967 France .
2306339 10/1976 France .
171029 10/1982 Japan ................ 60/602

Primary Examiner—Michael Koczo
Attorney, Agent, or Firm—Oblon, Fisher, Spivak, McClelland & Maier

[57] ABSTRACT

A control method and device for the waste gate of a turbocharged internal combustion engine. This exhaust discharge control device entails a waste gate held closed by at least one spring which pushes it back into the closed position against the engine air feed pressure prevailing immediately downstream from the compressor and acting on a control piston for the gate in order to bring about the opening of the gate and to bypass the turbine. The control chamber (20) delimited by at least a part of the surface of the control piston (22) is connected by a conduit (25) and a control valve (27) to a source of fluid under pressure (29, 28a). The control valve (27) is activated by the accelerator pedal (35) of the engine in the area (36) of low engine loads. The invention is applicable to the automatic bypassing of a supercharging turbocompressor's turbine at low engine loads.

11 Claims, 1 Drawing Figure

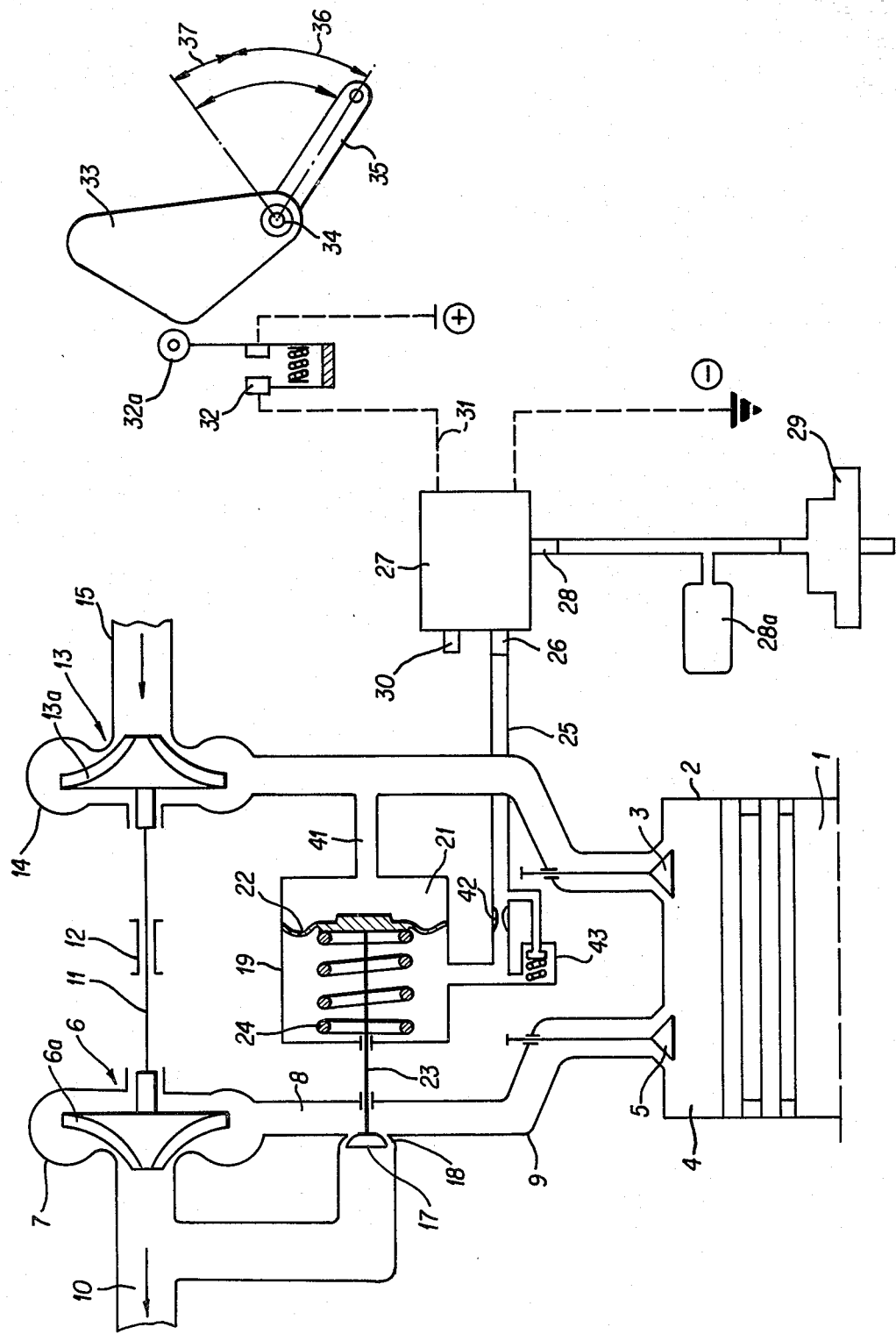

CONTROL DEVICE FOR THE TURBINE BYPASS VALVE OF A TURBOCHARGED INTERNAL COMBUSTION ENGINE

BACKGROUND OF THE INVENTION

1. Field of the Invention

This invention concerns a control device for the turbine bypass valve of a turbocharged internal combustion engine which is supercharged by at least one turbocompressor driven in a rotary manner by the residual energy of the exhaust gases.

2. Description of the Prior Art

The technique for the air supercharging of internal combustion engines by using the residual energy of the exhaust gases has developed over many years in various and gradual ways. It was initially used for aviation motors with controlled spark so as to regain their ground-level power at high altitudes, where the density of the air taken in is low, without damaging the engine which, under such circumstances, is suitably cooled by the relatively cold outside air. Following the Second World War, developments were oriented toward increasing the power and output of large diesel motors for which the exhaust energy, less in this type of motor, nevertheless made is possible to install centrifugal turbocharging units which were economically advantageous due to the scale effect of the large size of such motors used as marine engines, high-power fixed groups and, finally, railroad locomotive engines. With the technological progress made with turbocharged engines, in particular as regards the turbine rotor subjected to high exhaust temperatures (ranging from 600° C. to 800° C.), it became economically possible to install rotary or pressure-wave supercharging on the diesel engines of heavy trucks, and subsequently of luxury automobiles. A further economic and technological shift relating to turboblower supercharging units, prompted by the sizable jump in the cost of energy, now makes it possible to install supercharging devices on internal combustion and controlled-spark engines so as to reduce their displacement with loss of power.

However, the use of air supercharging by means of tapping the residual energy of the exhaust gases creates new technical problems when applied to controlled-spark motors. As it happens, the supercharging pressure for this type of engine tends to be at its peak at low revolutions per minute and under heavy engine load, which inevitably results in the appearance of a preignition and knocking phenomenon which is harmful under these operating conditions and stems not from too high a compression ratio, but rather from excess pressure of the carbureted mixture prior to compression. In order to overcome this difficulty, a control valve bypassing the turbine is installed in such a way that the exhaust flap of said valve is connected to a piston which is subjected, in the opening direction and in opposition to flap closing spring, to the feed pressure upstream from the compressor and downstream from the carburetor or fuel injection device. In this manner, when the air supercharging pressure of the motor exceeds a value predetermined by the calibration of the flap closing spring, the flap gradually closes and lowers the revolutions per minute of the turbine so as to stabilize the supercharging pressure at the predetermined value.

An examination of the performance obtained with vehicles currently equipped with small or medium displacement engines provided with turboblower supercharging devices reveals that, at the moderate speeds observed by the majority of the users of such vehicles, operators did not obtain the reductions in fuel consumption they were entitled to expect on the basis of the results obtained at high speeds, and that these mediocre results at moderate speeds were attributable in part to the exhaust back pressure imparted by the placement of the turbine rotor in the exhaust gas circuit.

SUMMARY OF THE INVENTION

One of the objects of this invention is precisely to reduce the exhaust back pressure at low loads on internal combustion engines which are supercharged by the residual exhaust energy of the engine, thereby reducing fuel consumption of such motors under a low load.

To this end, the control device for the exhaust valve of an internal combustion engine supercharged by at least one turbine-compressor unit driven in rotation by the engine exhaust, with the flap held shut by at least one spring which pushes it back into the closed position against the air feed pressure of the engine upstream from the compressor and acting on a valve control piston so as to prompt the flap to open and short-circuit the turbine when the engine's feed pressure exceeds a predetermined limit valve, is characterized in that the valve control piston is subjected to the action of a control fluid pressure controlled by the accelerator pedal of the engine and is such that it can bring about the opening of the exhaust valve whenever said accelerator pedal is placed in the area corresponding to small engine loads, thereby reducing or eliminating, under small engine loads, the exhaust back pressure brought about by the presence of the turbine in the exhaust circuit.

The preferred control pressure is the low pressure produced by the engine intake or by a vacuum pump, said low pressure acting directly on the surface of the control piston opposite the one subjected to the feed pressure prevailing upstream from the compressor. Regulation of the exhaust back pressure is thus possible using an energy source which is freely available on all modern vehicles.

The piston surface subjected to the low pressure serves as the support surface for a compression spring which pushes the exhaust valve back to the closed position, which makes it possible to devise an extremely compact regulating unit. Regulation of the control fluid pressure by the engine's accelerator pedal is effected by means of an electrovalve in which the electric command current is controlled by the accelerator pedal. The control fluid pressure may also be a hydraulic or pneumatic pressure acting on the control piston in opposition to the valve closing spring.

The exhaust valve control device just described is characterized in that a control chamber delimited by at least one part of the control piston's surface can be connected, through a conduit and a control valve, to a source of fluid under control pressure or, respectively, to the exhaust or the atmosphere, and in that the control valve is connected through command devices to the engine's accelerator pedal in such a way that, when said pedal is placed in the area which corresponds to low engine loads, the activation of the control valve for connecting the control chamber to the source of fluid under control pressure brings about the opening of the exhaust valve.

The control valve can, on the one hand, be placed in the open position so as to connect the control chamber to the source of fluid under pressure and bring about the opening of the exhaust valve when said lever is placed in the area (or notches) corresponding to low engine loads, and, on the other hand, connect the control chamber to the exhaust or the atmosphere whenever the engine's accelerator pedal is placed in the area corresponding to heavy engine loads so as to permit the valve to reclose pursuant to the action of its spring. The control valve is an electrovalve and the command devices activated by the accelerator pedal consist of an electric circuit for activating the electrovalve for which the circuit-breaking or circuit-making contacts, respectively, are activated by a cam or a pushrod connected mechanically to the accelerator pedal.

According to the most practical and usual mode of manufacture of the invention, the control chamber is delimited by the control piston on the side opposite the one subjected to the engine feed pressure and contains a spiral compression spring which pushes the valve back into the closed position, while the source of the control pressure consists of the low intake pressure over the engine or of a vacuum pump in such a way that the low pressure acting on the piston, and adding its action to that of the feed pressure of the engine downstream of the compressor, is capable of overcoming the calibration of the spring and bring about the opening of the exhaust valve at low engine loads. Furthermore, the control valve is capable of connecting the control chamber to the atmosphere through command devices connected to the engine accelerator pedal when said pedal is placed in the area corresponding to heavy engine loads, thereby permitting the valve to reclose when the engine air feed pressure immedfiately downstream from the compressor has not reached the predetermined limit valve which brings about its opening.

A delaying device such as a throttle may be added to the conduit connecting the control valve to the control chamber so as to delay the opening and or closing of the exhaust valve as a result of movements of the engine accelerator pedal. The throttle may be bypassed by a unidirectional flow device, such as a one-way valve, so as to permit the rapid opening and slow closing, or vice versa, of the exhaust valve.

In accordance with one practical mode of operation of the invention, when the internal combustion engine is used for the propulsion of an automobile, the accelerator pedal of said vehicle may be used to good advantage to regulate the control fluid pressure so as to bring about the opening of the exhaust valve when it is at an accelerator pedal position corresponding roughly to a cruising speed of between two thirds and three fourths of the vehicle's maximum speed on a level surface for which the supercharging of the engine intake begins to improve the engine's output.

BRIEF DESCRIPTION OF THE DRAWINGS

Various objects, features and attendant advantages of the present invention will be more fully appreciated as the same become better understood from the following detailed description when considered in connection with the accompanying sole drawing and wherein:

The sole FIGURE shows a preferred embodiment of the present invention.

DETAILED DESCRIPTION OF THE PREFERRED EMBODIMENT

In the sole FIGURE, the engine is represented schematically by a piston 1 which moves within a cylinder 2 in order successively to: draw in a carbureted mixture through the ring-shaped passage around an open intake valve 3; then compress it in a combustion chamber 4; and, following ignition and expansion of the burned carbureted mixture, push the burned gases through the ring-shaped passage around an open exhaust valve 5.

The motor is equipped with an air supercharging unit made of a centrifugal turbine 6 whose rotor 6a, housed inside a helix 7, is placed in the path of the exhaust gases escaping from a turbine intake conduit 8 connected to an exhaust pipe 9 connected directly to the output of the exhaust valve 5. The input of the turbine 6 is radial and the centripetal flow of the exhaust gases gives rise to an axial output connected to the exhaust pipe proper 10. The turbine rotor 6a is connected by a shaft 11 supported by a bearing 12, generally lubricated by the engine oil pressure, to a rotor 13a of a compressor 13 housed in a helix 14 and connected through an intake conduit 15 to air intake mechanisms generally consisting of at least one air filter.

The compressor rotor 13a, driven in rotation by the turbine rotor 6, draws the combustion air of the engine axially and discharges it radially in accordance with a centrifugal flow toward an intake manifold 16 which opens at the entryway of the intake valve 3.

In order to limit the intake pressure in the manifold 16 and in the combustion chamber 5, and consequently to limit the maximum combustion pressure exerted on the piston 1 in the case of a diesel engine or, in turn, the risk of knocking in the case of a controlled ignition engine, the circuit of the turbine 6 is provided with a draw-off system consisting of a waste gate 17 supported by a conical seat 18.

When the gate 17 leaves the seat 18, it opens a ring-shaped passage which allows the exhaust gases to be discharged directly from the exhaust pipe 9 into the exhaust system 10 while bypassing the passage of the said gases over the blades of the turbine rotor 6a. The flow of exhaust gases through the turbine 6 is thus reduced, which considerably decreases the speed of rotation of rotors 6a and 13a, thereby lowering the flow pressure from the compressor into the intake manifold 16.

The air pressure in the intake manifold 16 is regulated with the help of a regulating capsule 19, which consists of two chambers 20 and 21 separated by a piston 22, generally of the membrane type so as to obtain a perfect seal and low degree of hysteresis during operation.

In accordance with the technique involved, the chamber 21 is connected to the intake manifold downstream from the compressor 13 and the supercharging air pressure prevailing in this chamber 21 acts on the piston 22 connected by a rod 23 to the gate 17 in a direction opposing a spiral spring 24 housed in the chamber 20. When the pressure in the intake manifold 16 downstream from the compressor 13 and acting on the piston 22 is greater than the calibrated value of the spring 24, the gate lifts from its seat 18 and an increasing flow of exhaust gas is discharged directly into the exhaust system 10, which reduces the speed of the turbine rotor 6a and compressor rotor 13a and immediately stabilizes the supercharging pressure in the intake manifold 16.

In accordance with the invention, the chamber 20 containing the spring 24 is connected via a conduit 25 to the output connection 26 of an electrovalve 27, itself connected via a connection 28 through a reservoir 28a to a low pressure source consisting, for example, of a vacuum pump 29 or the engine intake presure, and via a connection 30 to the atmosphere. The electrovalve 27 is commanded by an electric circuit 31 powered, for example, by a battery through a switch 32 whose contacts are controlled by a cam 33 that acts on a pushrod 32a and rotates about an axis 34 of the engine's accelerator pedal 35, which in turn moves from an area, zone or position 36 corresponding to low engine loads toward an area, zone or position 37 corresponding to heavy engine loads. When the switch 32 is opened and the circuit 31 is disconnected as represented in the FIGURE, i.e., for the engine accelerator pedal position corresponding to low engine loads, the electrovalve 27 is placed, with the assistance of an internal spring, in a position which connects the low pressure source 29 to the chamber 20. To the contrary, when the pedal 35 is placed in the area 37 corresponding to heavy engine loads, the switch 32 is closed and the electrical circuit 31 receives power, thereby bringing about the commutation of the internal flaps of the valve 27 which separates the chamber 20 from the low pressure source 27 and connects it to the atmosphere via connection 30.

The operation of the control device for the exhaust valve is explained below. When the vehicle whose engine is equipped with a turbo-compressor unit regulated in accordance with the inventor is rolling at a constant, moderate speed, the accelerator pedal 35 is placed in the area 36 corresponding to low engine loads and the cam 33 is placed as shown in the FIGURE. The switch 32 is opened and the chamber 20 is connected to the low pressure source 29.

The virtually atmospheric pressure prevailing in chamber 21 acts in a direction opposite the low pressure prevailing in chamber 20 and pushes the gate 17 into the open position against the spring 24. The blading of the turbine rotor 6a is passed over by only part of the burned exhaust gases and the turbine rotor 6a and compressor rotor 13a revolve at a moderate speed, pushing into the intake manifold 16, under slight overpressure, the air which is ultimately drawn off by the low pressure prevailing during the intake stroke in the combustion chamber 4.

The overpressure with respect to atmospheric pressure and pervailing in the exhaust pipe 9 at the time exhaust valve 5 opens is slight, but nevertheless increases with the speed of the vehicle. However, it remains substantially below the exhaust back pressure of conventional supercharged engines not provided with devices for opening gate 17 under light loads.

If the driver accelerates the vehicle by placing the accelerator pedal 35 in the area 37 corresponding to heavy engine loads, for example in order to pass another vehicle, the contacts of switch 32 are closed and the electrovalve 27 is activated, thereby connecting the chamber 20 to the atmosphere. Spring 24 recloses the gate 17 on its seat 18 and the exhaust back pressure preavailing in the exhaust pipe 9 rapidly accelerates the turbine rotor 6a and compressor rotor 13a so as to bring about, after a short lag, an overpressure within the intake manifold 16 which increases with the speed of rotation of the engine, which increases the flow of exhaust gases.

When the engine speed under maximum acceleration reaches the revolutions per minute corresponding roughly to 75 percent of the engine speed at maximum power, the supercharging pressure prevailing in chamber 21 is sufficient to force gate 17 back open again against the spring 24 and the supercharging pressure ceases to increase. This stabilization of the supercharging pressure makes it possible to avoid knocking, or explosive combustion, in controlled ignition engines, and in diesel engines, to limit the load on the pistons and bearings at high speeds.

When the driver relaxes the pressure on the accelerator pedal, for example after passing or on a downgrade, switch 32 opens again and the electrovalve 27 once again connects chamber 20 to the low pressure source 29, and the gate 17 opens, bringing about a rapid braking of rotors 6a and 13a and the virtually instantaneous disappearance of the overpressure in the exhaust pipe 9.

The exhaust valve control device described just above may be used on both diesel engines (the fuel injector has not been represented in the FIGURE) and controlled ignition engines, whether provided with a carburetor or with fuel injection downstream from the compressor 13, and whether such engines are used in vehicles, especially automobiles, or on fixed mountings.

In certain uses, it may be worthwhile to delay the opening or closing of the gate 17, so that it lags behind the opening and closing, respectively, of switch 32. For this purpose represented herein is a delay throttle 42 on conduit 25. The throttle 42 may be bypassed by one-way valve 43 which opens when the chamber 20 is connected to the atmosphere through valve 27 when the accelerator pedal 35 is placed in the area 37 corresponding to heavy engine loads. The acceleration of rotors 6a and 13a required to increase the engine power, already naturally delayed by their high inertia at their normal speeds of rotation (up to 100,000 revolutions per minute) is thus not reduced by the delay in the command to the exhaust valve. The valve 43 may be installed in the opposite direction in order to protect the turboblower during cold starts prior to proper lubrication. Sudden jerks of acceleration thus have virtually no impact on the gate 17, but the preferred performance of the vehicle, which is no longer rapidly supercharged during sharp acceleration, has disappeared.

Of course, the invention is in no respect limited to the mode of manufacture described and represented; it may be modified in a number of ways by specialists depending on the applications envisaged and without departing from the spirit of the invention. Accordingly, the electrovalve 27 may be understood to be a valve with a large cross section which is controlled entirely pneumatically or hydraulically and commanded by an electrovalve with a smaller cross section and controlled by the switch 32, which may be time lagged.

For vehicles which have no low pressure source, such as heavy transport vehicles, but which do have compressed air or oil under pressure, the regulation capsule 19 may consist of a chamber which may be connected to a source of compressed air of hydraulic pressure and delimited by a portion of piston 20 or a piston connected to piston 20 and on which the regulating pressure is exerted in the direction which opens the gate 17. Likewise, the switch 32 may be replaced by the direct or remotely controlled mechanical actiavtaion of a control valve which fulfills the functions of the electrovalve 27. Circuit 31 may be broken by other switches than switch 32 so as to provide, for example, manual control of the opening of the gate 17, or to couple the opening of the gate 17 with the engine ignition breaker or injection timing.

What is claimed as new and desired to be secured by Letters Patent of the United States is:

1. A waste gate control device for an internal combustion engine having an accelerator pedal and supercharged by at least one turbine-compressor unit driven in a rotary manner by the engine exhaust, comprising:
   a waste gate;
   at least one capsule;
   a piston mounted in said capsule and connected to said waste gate;
   spring means disposed in said capsule for pushing the piston in a direction closing the waste gate;
   means for subjecting a first side of said piston to air feed pressure of the engine prevailing downstream of the compressor in order to bring about opening of the gate and bypass the turbine when the engine feed pressure exceeds a predetermined limited value, and for subjecting a second side thereof opposite said first side to a control fluid pressure adapted to bring about opening of the gate when the engine is under low loads; and
   a control valve commanded by the accelerator pedal of the engine to apply the control fluid pressure to the piston only when the pedal is placed in a position which corresponds to said low engine loads.

2. A Device according to claim 1, wherein the capsule further comprises control chamber means delimited by at least part of a surface portion of the piston and means for positioning the control valve in the open position in order to apply the control fluid pressure to the control chamber and bring about opening of the gate when the pedal is placed in the position corresponding to low engine loads, and, for connecting the control chamber to atmosphere when the engine accelerator pedal is placed in a position corresponding to heavy engine loads so as to enable the waste gate to reclose under the effect of said spring means.

3. A device according to claim 2, wherein the control valve further comprises an electrovalve; an electric activating circuit for controlling said electrovalve via said accelerator pedal; and a cam connected to the accelerator pedal for breaking and establishing said circuit.

4. A device according to claim 2 or 3, wherein the control chamber is delimited by the piston on a side opposite the one subjected to the engine feed pressure and contains said spring for pushing the piston in a direction closing the gate and wherein the control fluid pressure further comprises low engine intake pressure.

5. A device according to any one of claims 2, 3 or 4, further comprising a conduit connecting the control valve with the control chamber and a delay mechanism disposed in said conduit for retarding opening and/or closing of the gate under the effect of movement of the engine accelerator pedal.

6. A device according to claim 5, further comprising unidirectional flow means for bypassing said delay mechanism and allowing rapid opening and slow closing of the waste gate.

7. A device according to claim 2, wherein the control valve further comprises an electrovalve; an electric activating circuit for controlling said electrovalve via said accelerator pedal; and a pushrod connected to the accelerator pedal for breaking and establishing said circuit.

8. A device according to claim 5, further comprising a unidirectional flow mechanism for bypassing said delay mechanism so as to allow for rapid closing and slow opening of the waste gate.

9. A device according to claim 5, wherein said delay mechanism further comprises throttle means.

10. A device according to claim 6, wherein said unidirectional flow mechanism further comprises a one-way valve.

11. A device according to claim 2 or 3, further comprising a low pressure source wherein the the control chamber is delimited by the piston on a side opposite the one subjected to the engine feed pressure and contains said spring for pushing the piston in a direction closing the gate and wherein the control fluid pressure further comprises a low vacuum pressure from said low pressure source.

* * * * *